(12) United States Patent
Ignatian

(10) Patent No.: US 8,161,791 B2
(45) Date of Patent: Apr. 24, 2012

(54) PROVER SELF TESTING AND VALIDATION APPARATUS

(75) Inventor: Alexander Ignatian, Phoenix, AZ (US)

(73) Assignee: Flow Management Devices, LLC, Phoenix, AZ (US)

( * ) Notice: Subject to any disclaimer, the term of this patent is extended or adjusted under 35 U.S.C. 154(b) by 135 days.

(21) Appl. No.: 12/774,848

(22) Filed: May 6, 2010

(65) Prior Publication Data

US 2010/0241387 A1   Sep. 23, 2010

Related U.S. Application Data

(60) Continuation-in-part of application No. 12/652,820, filed on Jan. 6, 2010, and a division of application No. 11/972,530, filed on Jan. 10, 2008, now Pat. No. 7,650,775.

(51) Int. Cl.
   *G01P 21/00* (2006.01)
(52) U.S. Cl. ........................................ 73/1.19
(58) Field of Classification Search ........................ None
   See application file for complete search history.

(56) References Cited

U.S. PATENT DOCUMENTS

| | | | |
|---|---|---|---|
| 2,948,143 A | 8/1960 | Puritt | |
| 3,098,382 A | 7/1963 | Hoffman et al. | |
| 3,120,118 A | 2/1964 | Boyle | |
| 3,403,544 A | 10/1968 | Francisco, Jr. | |
| 3,492,856 A | 2/1970 | Francisco, Jr. | |
| 3,768,510 A | 10/1973 | Reves | |
| 3,877,287 A | 4/1975 | Duntz, Jr. | |
| 3,997,420 A | 12/1976 | Buzza | |
| 4,152,922 A | 5/1979 | Francisco, Jr. | |
| 4,365,503 A | 12/1982 | Ho et al. | |
| 4,372,147 A | 2/1983 | Waugh et al. | |
| 4,390,035 A | 6/1983 | Hill | |
| RE31,432 E | 11/1983 | Francisco, Jr. | |
| 4,481,805 A | 11/1984 | Dobesh | |
| 4,537,058 A | 8/1985 | Luper | |
| 4,627,267 A | 12/1986 | Cohrs et al. | |
| 4,628,724 A | 12/1986 | Maurer | |
| 4,637,244 A | 1/1987 | Maurer et al. | |
| 4,674,316 A | 6/1987 | Albrecht et al. | |
| 4,718,267 A | 1/1988 | Capper | |
| 4,766,759 A | 8/1988 | Cohrs et al. | |

(Continued)

OTHER PUBLICATIONS

Daniel; "Brooks Compact Prover by Daniel", Emerson Process Management, 2005 Daniel Measurement and Control Inc., p. 1-15.

*Primary Examiner* — Robert R Raevis
(74) *Attorney, Agent, or Firm* — The von Hellens Law Firm, Ltd.

(57) ABSTRACT

A prover includes a piston supporting rod extending longitudinally through a cylinder, which cylinder receives and discharges a fluid to measure the volume and flow rate of the fluid by translation of the piston from the fluid receiving end to the fluid discharging end. Motive means includes at least one element for drawing the rod and piston toward the fluid receiving end of the cylinder. Travel of the piston in the direction from the fluid receiving end to the fluid discharging end of the cylinder is sensed at discrete locations to provide an indication of the quantity of fluid therebetween and the related flow rate. Each of a plurality of switches, linear encoder or laser detector provides position sensing signals reflective of the volume and rate of fluid flowing in the cylinder. These signals, representative of this volume and flow rate, are compared with preset parameters to determine the degree of equivalence. Thereby, self testing and validation occurs.

24 Claims, 13 Drawing Sheets

U.S. PATENT DOCUMENTS

| | | |
|---|---|---|
| 4,829,808 A | 5/1989 | West |
| 5,052,211 A | 10/1991 | Cohrs et al. |
| 5,251,489 A | 10/1993 | Lalin |
| 5,408,886 A | 4/1995 | Lalin |
| 7,650,775 B2 | 1/2010 | Ignatian |

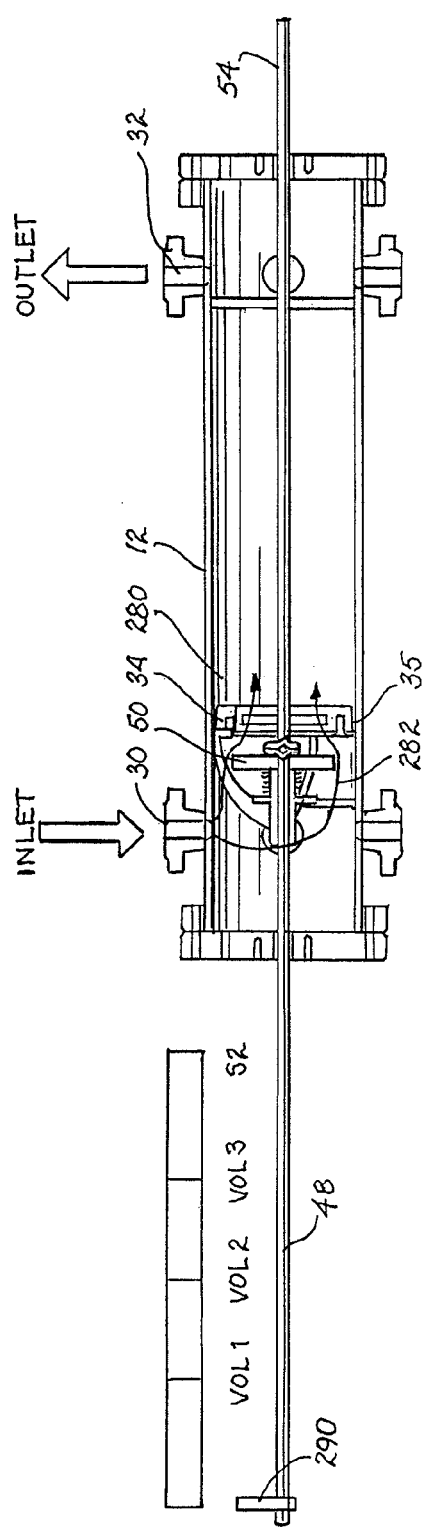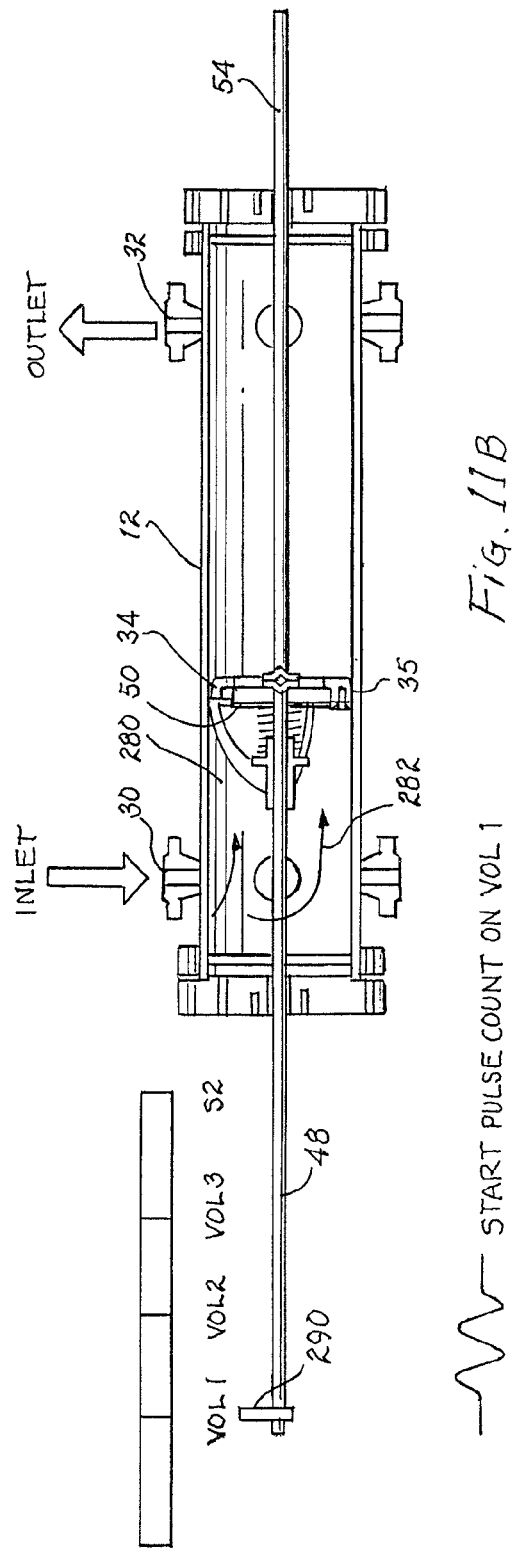
Fig. 11A
Fig. 11B

PROVER SELF TESTING AND VALIDATION APPARATUS

CROSS REFERENCE TO RELATED APPLICATIONS

The present application is a continuation-in-part application of an application entitled "METHOD FOR MOUNTING A PROVER", filed Jan. 6, 2010 and assigned Ser. No. 12/652,820, which is a divisional application of an application entitled "UNIDIRECTIONAL CAPTIVE DISPLACEMENT PROVER" filed Jan. 10, 2008, and assigned Ser. No. 11/972,530, now U.S. Pat. No. 7,650,775.

FIELD OF THE INVENTION

The invention relates to the field of measuring fluid flow and, more particularly, to self testing and validating apparatus for a prover.

BACKGROUND OF THE INVENTION

In order to obtain accurate readings from a flow meter or prover, it must be calibrated periodically by determining its characteristic or K-factor. The K-factor is a constant of proportionality between the flow rate of the fluid flowing through the flow meter and the response provided by the flow meter to the flow rate. A typical turbine type flow meter develops electrical oscillations proportional in number to the volume of flow through the flow meter. The characteristic is expressed in terms of the number of pulses generated by the flow meter per unit volume of fluid passing through the flow meter. Moreover, the characteristic is a function of the type of fluid as well as the fluid temperature, pressure, flow rate and varies as the flow meter parts wear in the course of use. An apparatus for determining the characteristic of a flow meter while in an operating fluid system is called a 'prover.' An apparatus for determining the characteristic of a flow meter on a test stand and not in a fluid system is called a 'calibrator.'

It is well known to determine the characteristic of a flow meter by comparing its response to a ballistic flow calibrator or prover connected in series with the flow meter. A prover uses a piston that travels in a cylindrical chamber in synchronism with a fluid traveling through the flow meter. By measuring the time interval required for the piston to travel through a known volume of the chamber, an average flow rate can be calculated. These calculations may be used to determine the characteristic (K-factor) of the flow meter.

In existing provers, the release and return of the piston involves many difficult mechanical problems which have not been regularly overcome. These mechanisms tend to be complex and the prover itself bulky and costly to construct. Some provers utilize complex reverser valves to reverse the direction of flow in a cylinder and thereby return the piston to its original position. Other embodiments utilize devices to retract a piston and restrain it in the upstream position or bypass the flow of the piston by means of a poppet or bypass valve when the prover is not being used in a proving test. Provers utilizing valves to reverse the direction of flow are known as 'bi-directional provers' because the proving test may be made with the piston traveling in either direction. Provers utilizing devices to retract and restrain the piston are known as 'unidirectional provers' because the fluid and piston always travel in the same direction in the cylinder during a test.

Numerous patents have issued disclosing various types of provers. U.S. Pat. No. 3,492,856 discloses a ballistic flow calibrator in which the piston has a passage through it. A valve seals the passage when it is closed and permits fluid flow through the piston when it is opened. U.S. Pat. No. 4,152,922 discloses a ballistic flow calibrator with an auxiliary piston and an auxiliary cylinder to control a fluid displacement measuring piston which moves through a fluid measuring cylinder as a fluid barrier the same distance as the auxiliary piston moves through the auxiliary cylinder. U.S. Pat. No. 3,492,856 describes a unidirectional flow meter calibrating apparatus employing a piston within a conduit where the piston is restrained in the upstream position by means of a complex motor, clutch and cable assembly located upstream of the conduit. A poppet valve, held open by the cable, provides a fluid passage through the piston when the apparatus in not being used for flow measurements. Releasing the cable permits fluid pressure to close the poppet valve setting the piston in motion. U.S. Pat. No. 4,152,922 discloses a prover in which a measuring piston is returned and restrained in its upstream position by means of a second control piston. The control piston travels through a separate control cylinder and is linked to the measuring piston by a rod. A source of pressurized air is used to move the control piston. U.S. Pat. No. 4,794,783 discloses a similar prover wherein the control cylinder is moved by pressurized hydraulic fluid.

SUMMARY OF THE INVENTION

The prover of the present invention includes a rod supporting a poppet valve formed as part of a piston within a cylinder having a fluid inlet and a fluid outlet. A pair of motor driven pulleys are used to wind thereupon a pair of belts having their ends secured to a shuttle fixedly attached to the rod. Upon actuation of the motor driving the pair of pulleys, the belts are wound thereupon to draw the rod and piston toward the inlet. The force exerted by the rod upon the poppet valve and the piston opens the poppet valve to permit fluid flow therethrough. To conduct a test, a clutch disengages the motor from the pulleys to accommodate rectilinear translation of the rod, closure of the poppet valve, and movement of the piston in response to the flow of fluid into the cylinder through the inlet. Various limit switches responsive to the position of the rod (piston) may be used to provide information related to the volume displaced in the prover and the flow rate, which information is compared to preset parameters. Alternatively, linear encoders or lasers may be used to determine the position and translation of the shuttle and hence the piston. An encoder may also be used to reflect translation of the belt or cable attached to the shuttle. These encoders or lasers provide signals reflective of the degree and rate of translation of the piston and corresponding volume of fluid. If there is not equivalence between the volume and rate of flow of the fluid with preset parameters, an error signal to that effect will be generated. In the absence of an error signal, validation of the prover will have been accomplished.

BRIEF DESCRIPTION OF THE DRAWINGS

The present invention will be described with greater specificity and clarity with reference to the following drawings, in which:

FIGS. 11A, 11B and 11C illustrate the generation of pulses as a function of the displacement of the piston within the cylinder of the prover;

DESCRIPTION OF THE PREFERRED EMBODIMENT

Figures 1, 2:
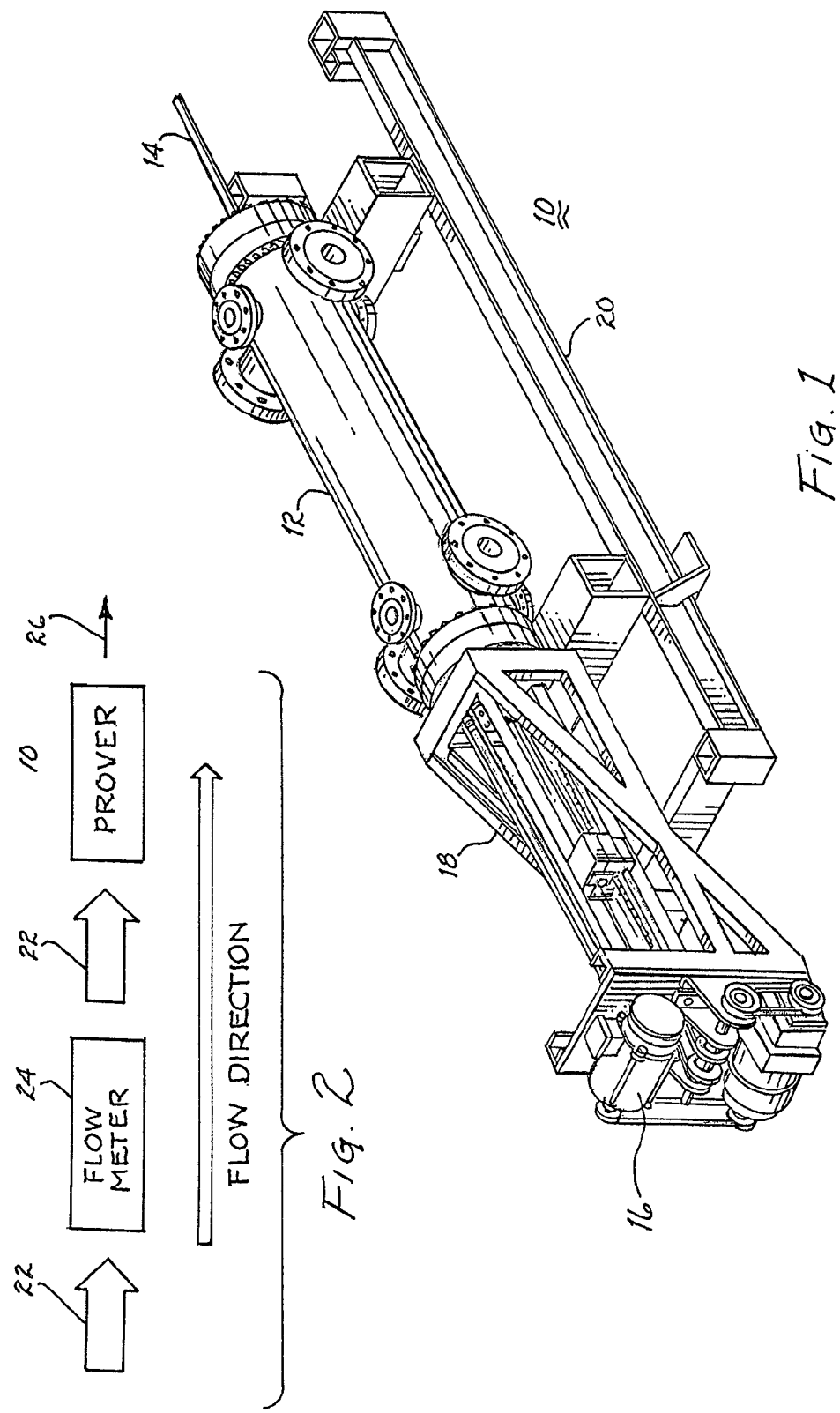
FIG. 1 is an isometric view of the prover horizontally mounted on a framework.
FIG. 2 is a graphic illustration of the fluid flow attendant the prover.

Referring to FIG. 1, there is illustrated a unidirectional captive displacement prover 10. The prover includes a cylinder 12 having a rectilinearly translatable piston with a poppet valve disposed therein and mounted on a rod 14. Motive means, generally identified by reference numeral 16, is supported upon a frame 18 attached to and extending from cylinder 12. The motive means imparts a force to rod 14 to cause translation in one direction of the piston within the cylinder. A clutch accommodates free translation of the rod and piston in the other direction.

Prover 10 is mounted upon a framework 20 that is attached at a location generally adjacent a flow meter 24 (see FIG. 2) to be periodically tested. As particularly shown in FIG. 2, a fluid 22 flows through a flow meter 24, which flow meter is to be tested, and into prover 10. Outflow from the prover is channeled into a conduit for the fluid, as represented by arrow 26. The prover includes various sensors and test equipment for determining the flow therethrough. This flow is compared to the indicated flow through the flow meter. Any difference reflects an adjustment to be made to the flow determined by the flow meter. This is generally referred to as a K-factor. Such testing of flow meters is required due to wear and other factors affecting the accuracy of the prover and flow meter over time. Additionally, maintenance or replacement of parts may affect the accuracy of the prover and flow meter and require testing in order to adjust and thereby correct the data provided by the flow meter.

Figure 3:
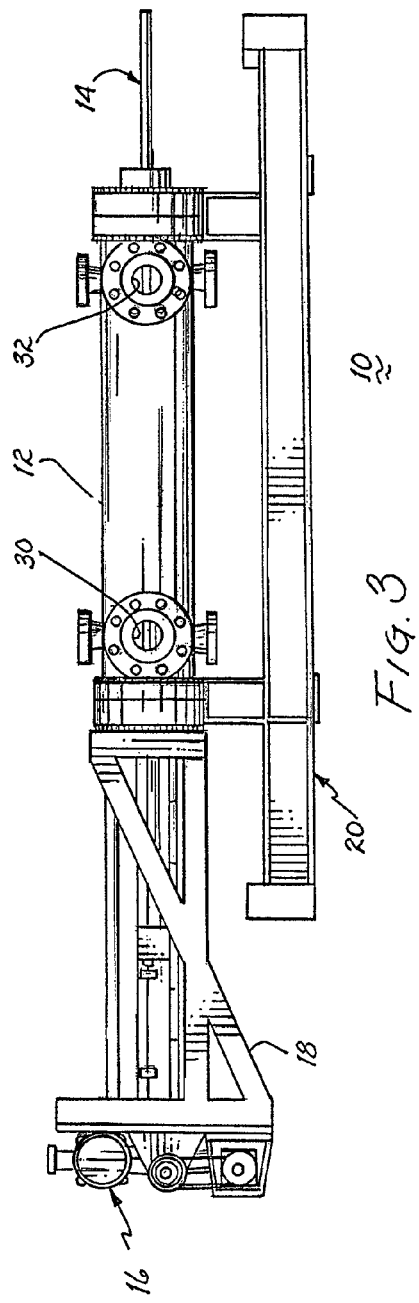
FIG. 3 is a side elevational view of the prover showing the fluid inlet and outlet.
Figure 4:
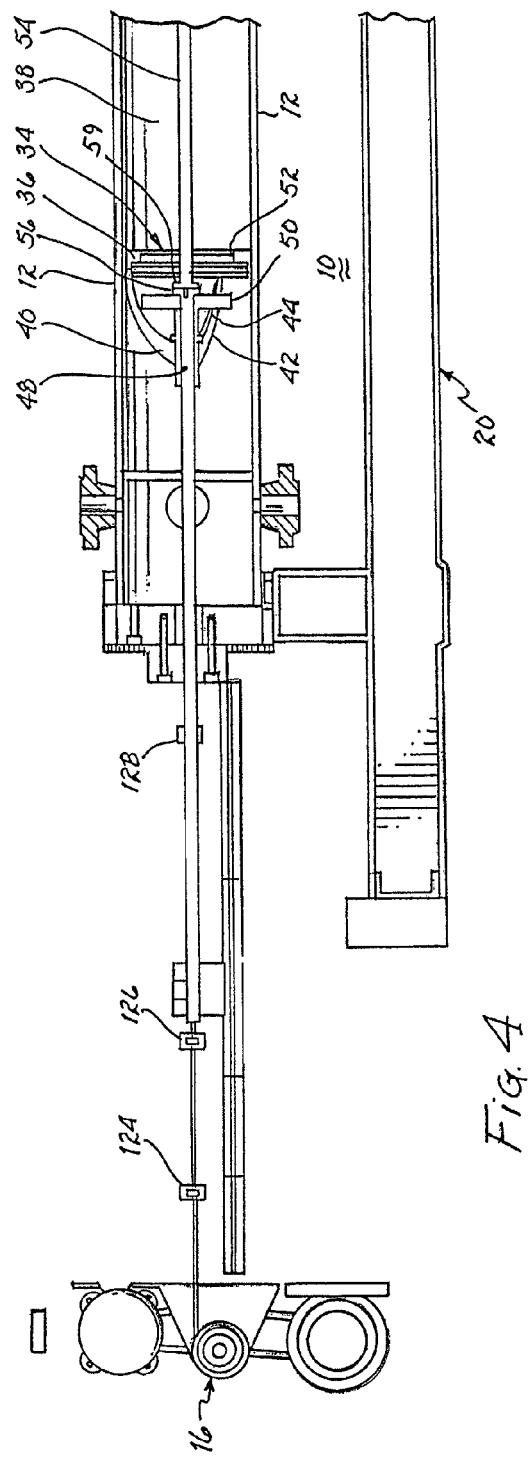
FIG. 4 is a partly cutaway view showing the poppet valve and piston disposed within the cylinder.

Referring jointly to FIGS. 1, 3 and 4, further details of prover 10 will be described. Cylinder 12 includes an inlet 30 for receiving fluid from the flow meter (see FIG. 2). After fluid passes through the cylinder, it is exhausted through outlet 32 into a conduit for the fluid. A piston 34 is rectilinearly translatable within cylinder 12. The piston includes a ring 36 in sealed engagement with interior surface 38 of the cylinder, which sealing means accommodates translation of the piston relative to the cylinder without leakage. Ring 36 is supported by three arms 40, 42 and 44 extending from a sleeve 46 slidably encircling rod section 48 of rod 14. A poppet valve 35 includes a disk 50, configured to mate with opening 52 within ring 36. Seals are disposed between the disk and the ring to ensure that fluid does not leak therebetween. Rod 14 includes a further rod section 54. The abutting ends of the two rod sections include annular flanges 56, 58 mechanically attached to one another to thereby form rod 14. Disk 50 is mechanically attached to flange 56 of rod section 44 to ensure that translation of rod 14 causes a corresponding translation of the disk. A coil spring (not shown in FIG. 4) biases the disk against the ring to maintain a seal therebetween.

Figure 5:
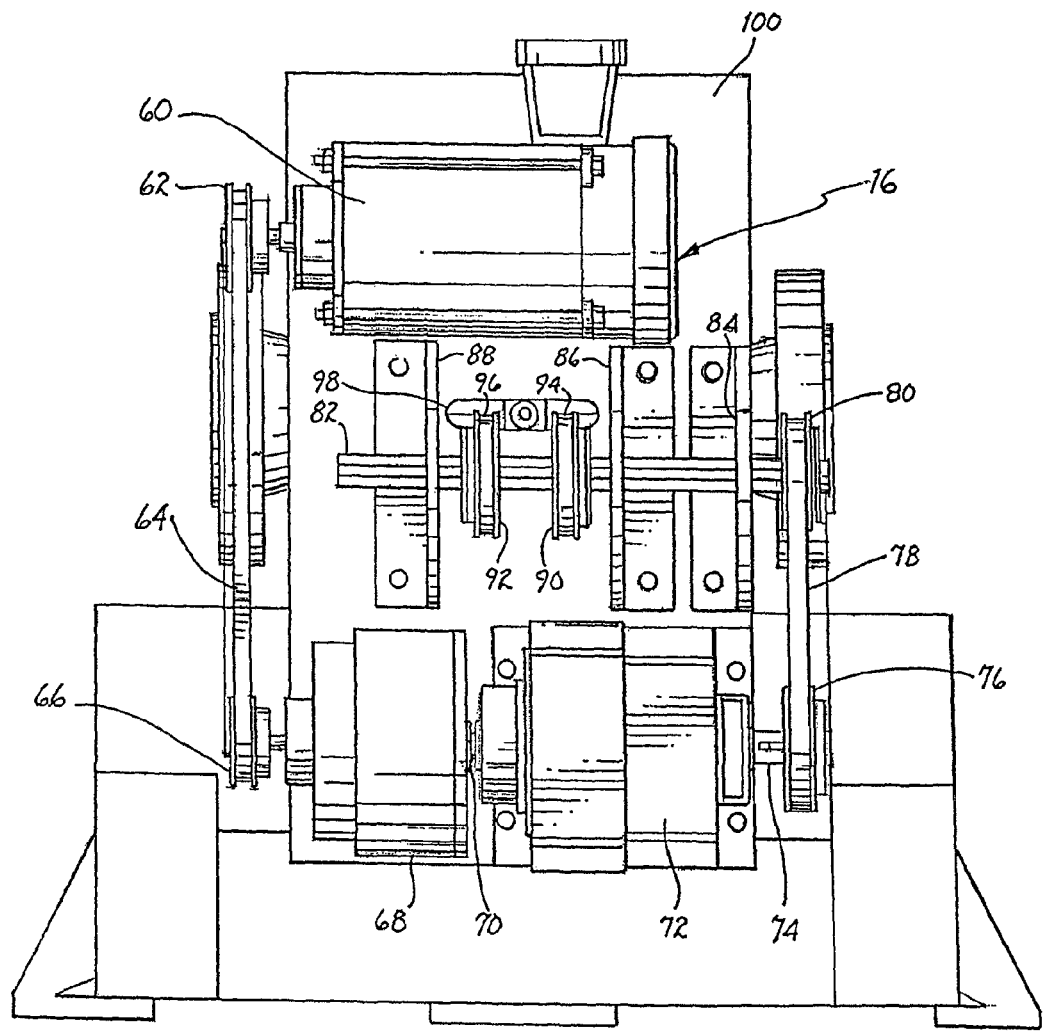
FIG. 5 is a rear view of the prover showing the motive apparatus for achieving rectilinear translation of the rod supporting the piston and the poppet valve.

Motive means 16, as shown in the end view depicted in FIG. 5, as well as in FIGS. 1, 3 and 4, includes an electric motor 60 for rotating a pulley 62 driving a belt 64. The belt engages a further pulley 66 driving a gear reduction unit 68. Shaft 70 of the gear reduction unit is connected to a clutch 72. Output shaft 74 of the clutch is or is not connected to shaft 70 as a function of operation of the clutch. The shaft 74 supports a pulley 76 driving a belt 78 in engagement with a further pulley 80. Pulley 80 is attached to shaft 82, which shaft is journaled within supports 84, 86 and 88 and supports reels 90, 92. To ensure commensurate rotation of the reels upon rotation of shaft 82, the interconnection may be splined or otherwise rigidly interconnected. Each of reels 90, 92 has attached thereto a belt 94, 96, respectively, which belts extend through opening 98 in plate 100, a part of frame 18.

It is to be understood that motive means 16 may be not only the electric motor described and illustrated, but could be a hydraulic motor, an internal combustion engine or other power source. Furthermore, the belts (64, 78) driving the associated pulleys (62, 66 and 76, 80) in the motive means could be replaced by conventional chains driving sprockets instead of pulleys. Belts 64, 78 and their respective pulleys 62, 66 may be collectively referred to as 'driving elements.' Similarly, belts 94, 96 extending from take up reels 90,92 could be replaced by conventional chains and take up sprockets, respectively. In a less preferred embodiment, belts 94, 96 could be replaced by cables and reels 90, 92 would be replaced by suitably configured reels to accommodate the cables. Belts 94, 96 and substitutable chains or cables may be collectively referred to as 'drawing elements.'

Figure 6:
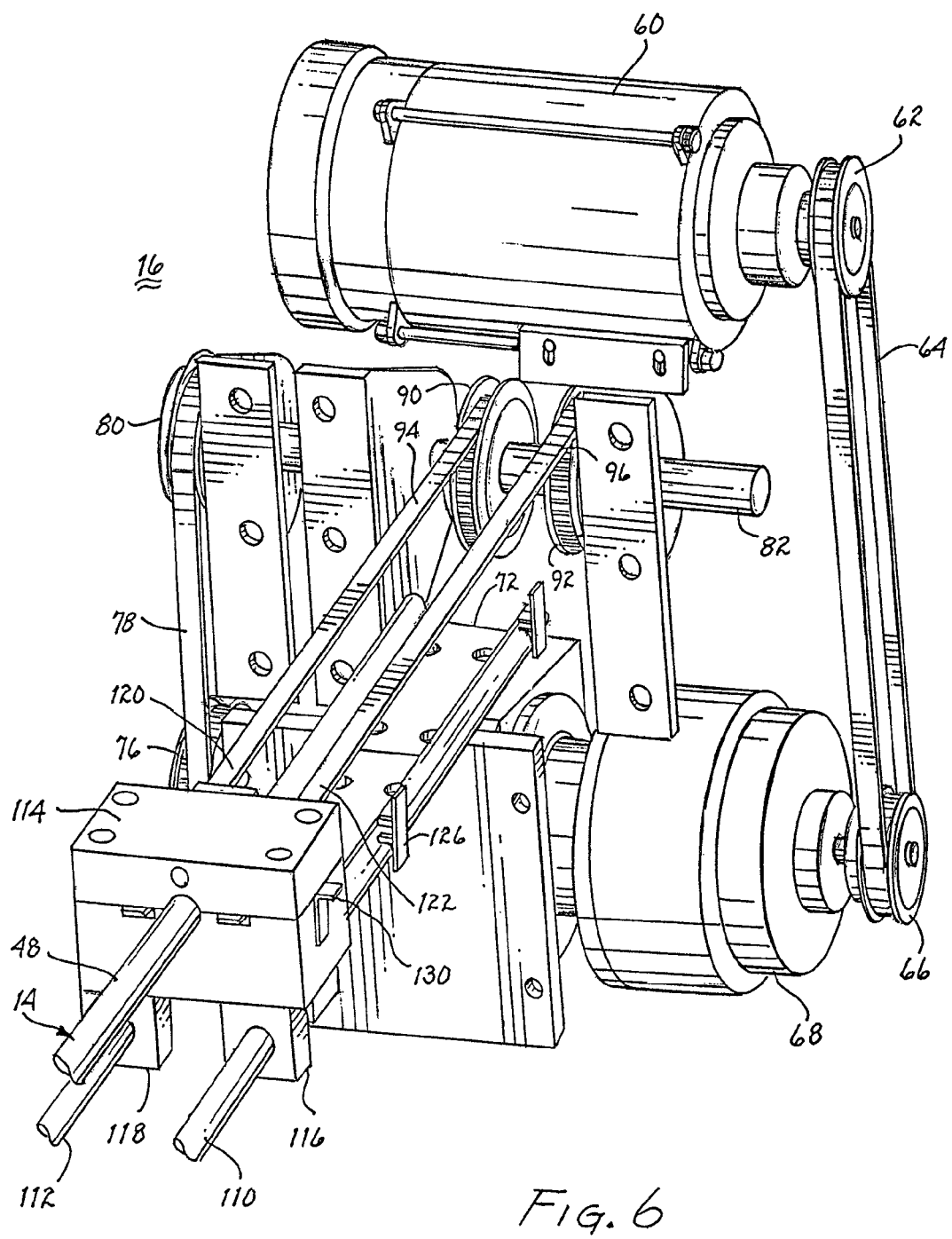
FIG. 6 is an isometric view of the motor driven apparatus for translating the rod.
Figure 7:
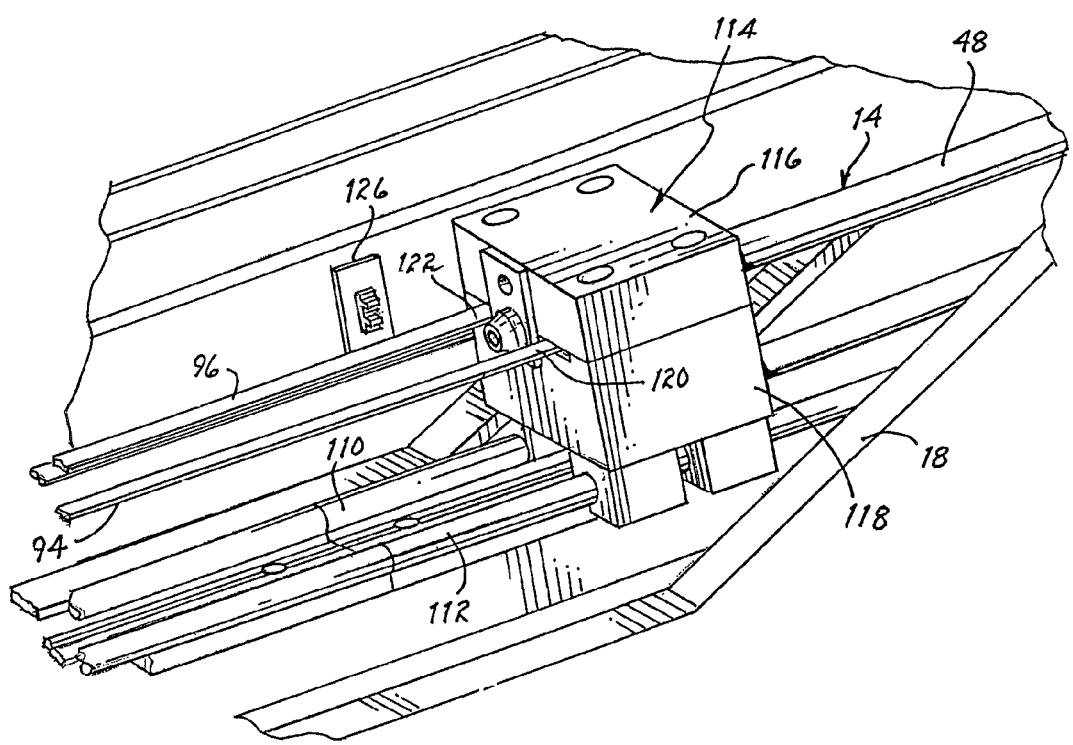
FIG. 7 is a detail view of the shuttle interconnecting the rod and a pair of belts.

Referring particularly to FIGS. 6 and 7, the interconnection between motive means 16 and rod 14 will be described. A pair of rods 110, 112 are attached to and extend intermediate cylinder 12 and frame 18. A shuttle 114 includes bearing blocks 116, 118 in slidable engagement with rods 110, 112. Thereby, the shuttle is slidable along these rods. Rod section 48 of rod 14 is rigidly clamped to shuttle 114 to ensure that any movement of the shuttle results in corresponding movement of the rod. Ends 120, 122 of belts 94, 96, respectively, are clamped or otherwise attached to shuttle 14. Thereby, any rectilinear motion of the belts will result in commensurate translation of the shuttle.

To control operation of rod 14 and poppet valve 35, a plurality of limit switches responsive, for example, to the position of shuttle 114 may be used. For example, as shown in FIG. 4, switch elements 124, 125, 128 may be mounted on frame 18 to cooperate with a further switch element 130 on shuttle 114. These switch elements may be mechanical, electrical or optical, as is well known in the art. Actuation of one or another of the switch elements will result in the generation of appropriate command signals relating to operation of motive means 16 and/or the position of the piston, as will be described below.

Automated procedures have a number of advantages wherein electrical signals are generated upon actuation of a switch, whether mechanical, optical or electronic. The signal produced by such a switch is used to initiate a process or procedure that may continue until such time as a further switch terminates the operation of the process or procedure. By using such switches to control the operation, such as through a computer program, various data can be generated as a function of the mechanical activity undergoing between operation of start and finish switches. The resulting data may be used for numerous purposes, including monitoring the operation, testing the function of the operation and comparing such function with a preset function to generate an error signal, if appropriate. It may also be used for purposes of self testing the operation and for validation and/or calibration purposes.

Figure 8A:
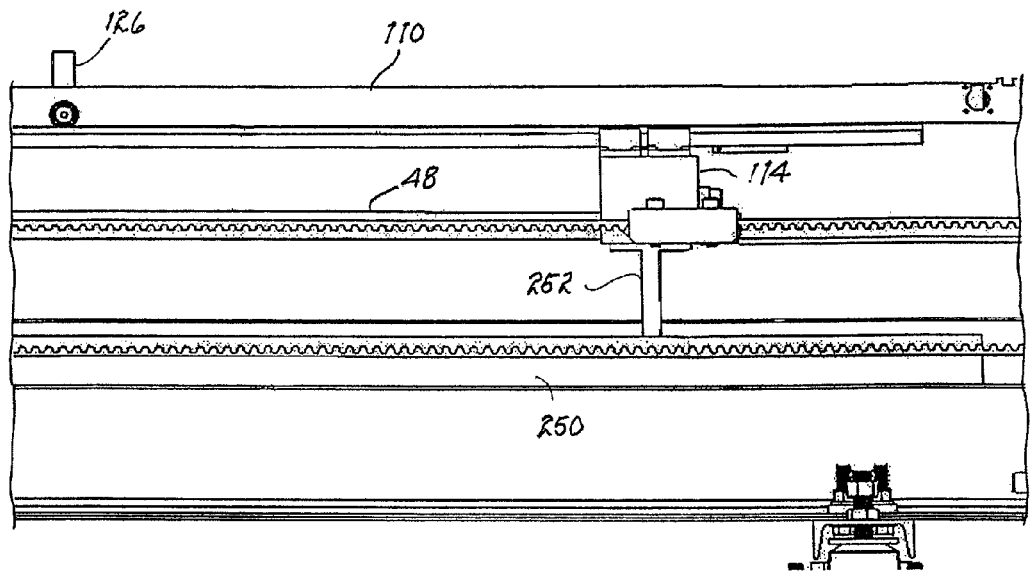
FIGS. 8A and 8B illustrate the use of a linear encoder to determine the position of the shuttle.
Figure 8B:
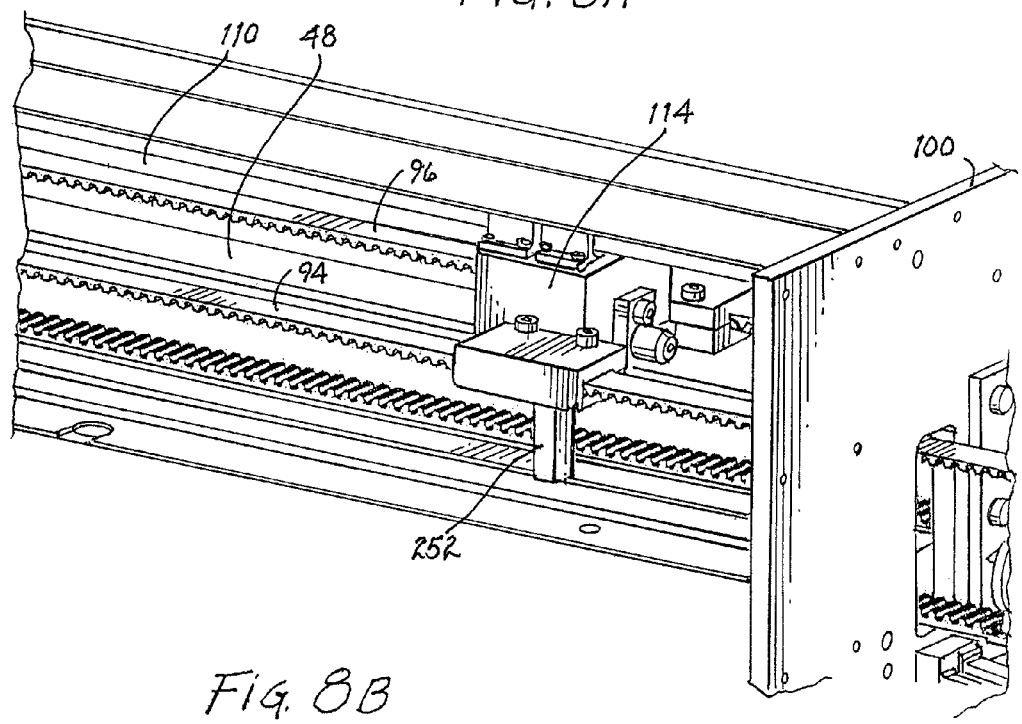

FIGS. 8A and 8B illustrate a further apparatus for determining the position of shuttle 114 and hence the position of piston 34 within the prover. An off-the-shelf linear encoder 250 extends from plate 100 to the support for the prover. A bracket 252 extends from shuttle 114 into operative engagement with the linear encoder. Thereby, a signal may be generated as a function of the position of the shuttle (bracket 252) relative to the linear encoder to provide an accurate determination of not only the position of the shuttle but the extent and rate of movement of the shuttle. As noted above, the shuttle is in operative engagement with piston 34 through rod section 48. Thereby, the position of the shuttle is commensurate with the position of the piston within the prover. As noted above, belts 94 and 96 are secured to shuttle 114 to draw the shuttle and the attached piston upstream within the prover and released to permit movement of the shuttle in the opposite direction in response to the flow of fluid into the prover. A rod 110 (switch bar) supports a plurality of switches 126, as discussed above.

Figure 9:
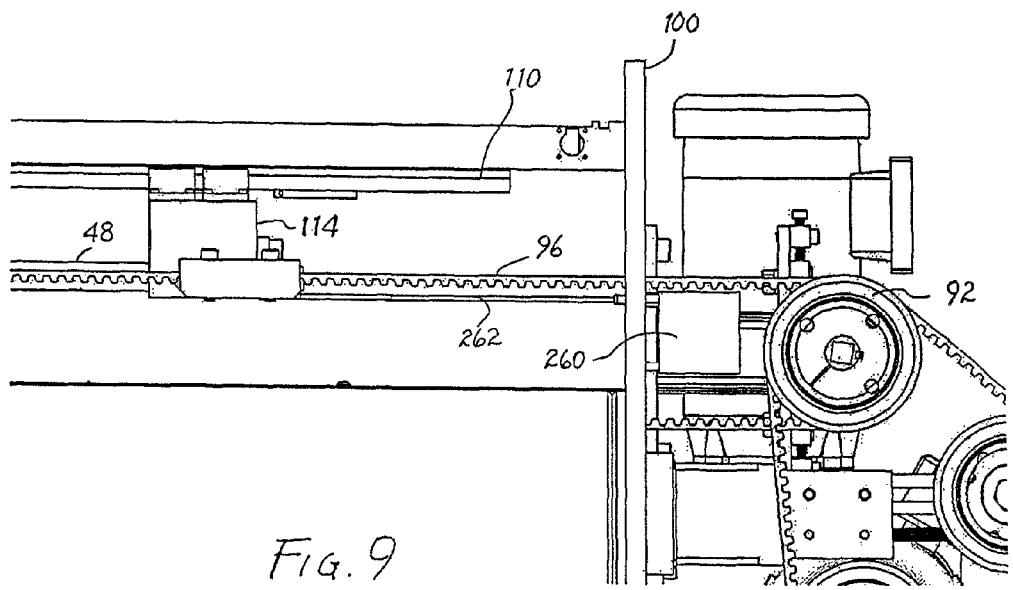
FIG. 9 illustrates the use of a linear encoder for sensing travel of the shuttle and connected belt or cable.

As shown in FIG. 9, reel 92, when under power, draws belt 94 toward plate 100 resulting in translation of the shuttle 114 towards plate 100 and piston 34 toward the upstream end of the prover. Thereafter, a clutch releases the belt(s) to accommodate movement of the piston (and shuttle) downstream in response to fluid flow into the cylinder. An off-the-shelf cable reel encoder 260 is secured to plate 100 and includes a cable 262 functionally attached to shuttle. The cable reel encoder provides a signal as a function of the translation of the cable in response to movement of the piston downstream and commensurate movement of the shuttle. This signal is functionally associated with the position of shuttle 114 and hence the position of piston 34 within the prover. Thereby, translation of cable 262 is reflective of and commensurate with the translation of piston 34.

Figure 10:
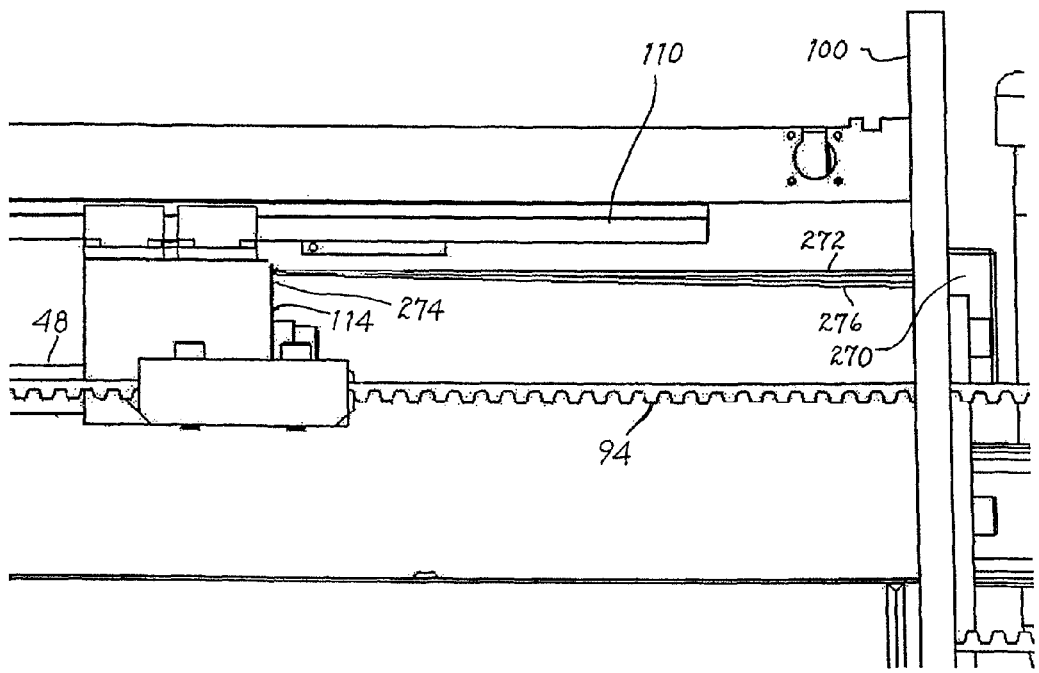
FIG. 10 illustrates the use of a laser detector to determine the position of the shuttle.

Referring to FIG. 10, there is shown a further apparatus for accurately determining the position of shuttle 114 and hence the position of piston 34. Herein, and off-the-shelf laser detector 270 is mounted on plate 100. It emits a beam 272 to impinge upon surface 274 of shuttle 114 and reflect a return beam 276. The distance between laser detector 270 and shuttle 114 is accurately determined by the laser detector. Thereby, an accurate position of the shuttle as it moves toward and away from plate 100 may be reflected in a signal generated by the laser detector. Hence, the commensurate position of piston 34 is similarly calculatable with great accuracy.

Figure 11C:
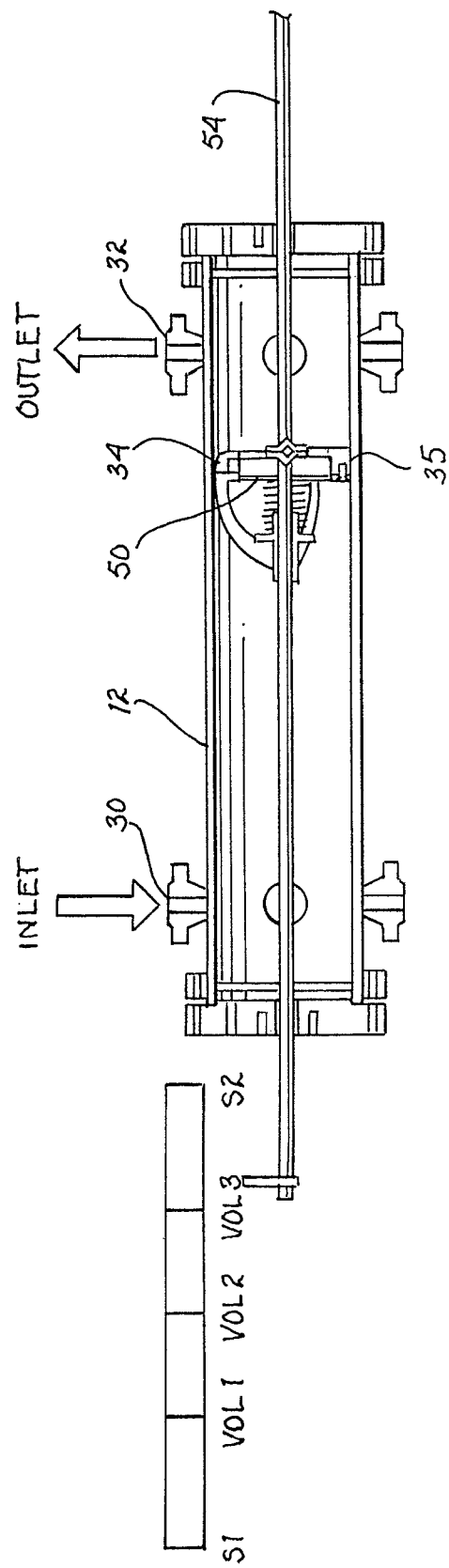

Referring jointly to FIGS. 11A, 11B and 11C, the methodology for self-testing and validation of the prover will be described. In general, a microprocessor and associated program measures the time and distance between actuation of position responsive switches or other determinants providing an indication of the position of the shuttle as well as the rate of translation between predetermined fixed locations. As the volume of the cylinder is known, (diameter and length are known), calculation of the time and distance between the switches, or other predetermined positions of the shuttle, the volume and the rate of flow can be determined and compared with information manually entered into the microprocessor. Any differences determined as a result of such comparisons will provide an error signal if there is a variation between the calculated factors and the previously established factors. Thereby, self-testing is accomplished and validation of accuracy or an error will be determinable. Additionally, temperature and pressure sensors may be employed to calculate compensation factors for the flow rate and volume and thereby ensure accuracy of the validation or error signal.

As shown in FIG. 11A, switch S1 may be actuated by a representative trigger 290 mounted on rod (switch bar) 110 to release the reels or pulleys supporting the belts or cables and thereby permit shuttle 114 and piston 34 to translate from the upstream end to the downstream end as a function of fluid inflow through inlet 30, as represented by arrows 280 and 282. The inflowing fluid will close poppet valve 35 by translation of disk 50 into sealed engagement with ring 36. When trigger 290 reaches a position corresponding with volume 1 (Vol 1), a start pulse is initiated, as illustrated in FIG. 11B. At a position corresponding with volume 2 (Vol 2) or volume 3 (Vol 3), a stop pulse is generated by trigger 290. The time between the start and stop pulses provide data to determine the volume of fluid existing within cylinder 12 and positionally corresponding with the distance represented between Vol 1 and Vol 2 or 3. Thereafter, the above-noted calculations can be made to validate the operation of the prover or to generate an error signal.

Figure 12:
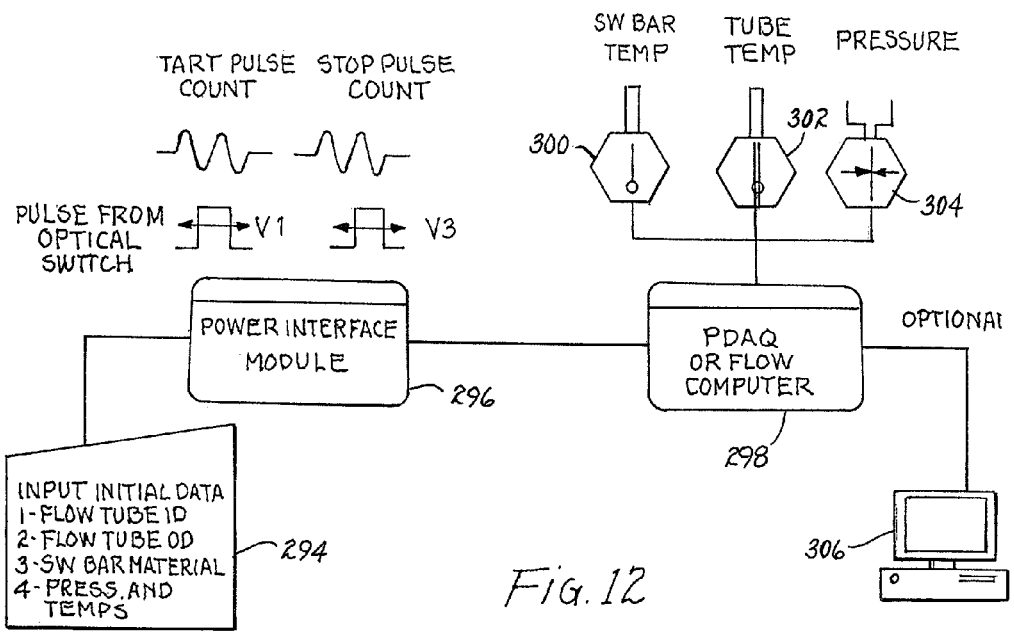
FIG. 12 is a schematic diagram showing the functions for calculation of validation or error signals of the operation of the prover.

Referring to FIG. 12, there is a schematic representation of the above-described operation. As represented by block 294, initial data is provided to the microprocessor including the ID and OD of cylinder 12, the material of rod (switch bar) 110 supporting a plurality of switches along with pressure and temperature indicia. A prover interface module 296 receives a signal representative of the start pulse count and the stop pulse count, which may be generated by the mechanical switches, the encoders or the laser described above. A flow computer 298 receives data from a temperature sensor 300 providing an input of the present temperature of rod (switch bar) 110. A temperature sensor 302 provides the temperature of cylinder 12. A pressure sensor 304 provides an indication of the pressure within the cylinder. Through computations within the flow computer, these three signals may modify the data received from the power interface module to provide an accurate output. Such output may be displayed as indicia on a screen 306 of a computer or the like. Other devices may be used to provide a signal representative of the output from the flow computer. It is to be understood that the output from the flow computer may confirm validation of operation of the prover or may provide an error signal. In the latter event, corrective action may be taken by operating personnel.

Figure 13:
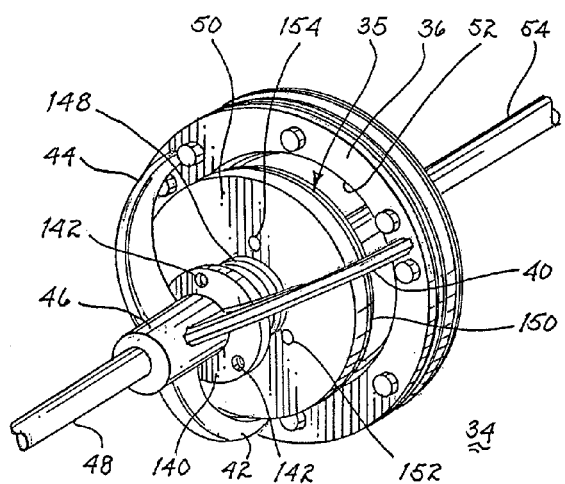
FIG. 13 illustrates the piston and associated poppet valve.

FIG. 13 is a detailed view of piston 34 and poppet valve 35 generally shown in FIG. 4. An annular flange 140 is secured to sleeve 46 and arms 40, 42 and 44. This flange includes three passageways 142, 144 and 146 (not shown) equiangularly disposed in flange 140. A coil spring 148, or the like, is disposed about rod section 48 to urge movement of disk 50 toward ring 36 and into sealing engagement therewith. A plurality of annular seals 150 are disposed about disk 50 for sealing engagement with opening 52 in the ring. Disk 50 includes a plurality of threaded apertures 152, 154 and 156 (not shown) equiangularly displaced in the disk radially external of spring 148 and in alignment with apertures 142, 144, and 146 (not shown), respectively.

Figure 14:
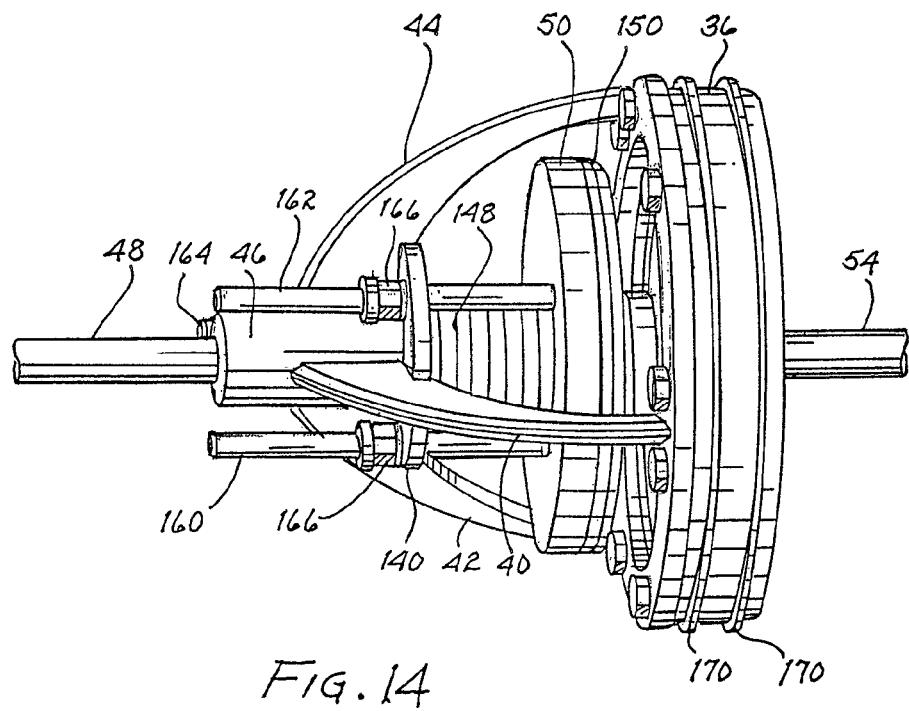
FIG. 14 illustrates the mechanism for manually opening the poppet valve to perform maintenance and/or repair on the poppet valve.
Figure 15:
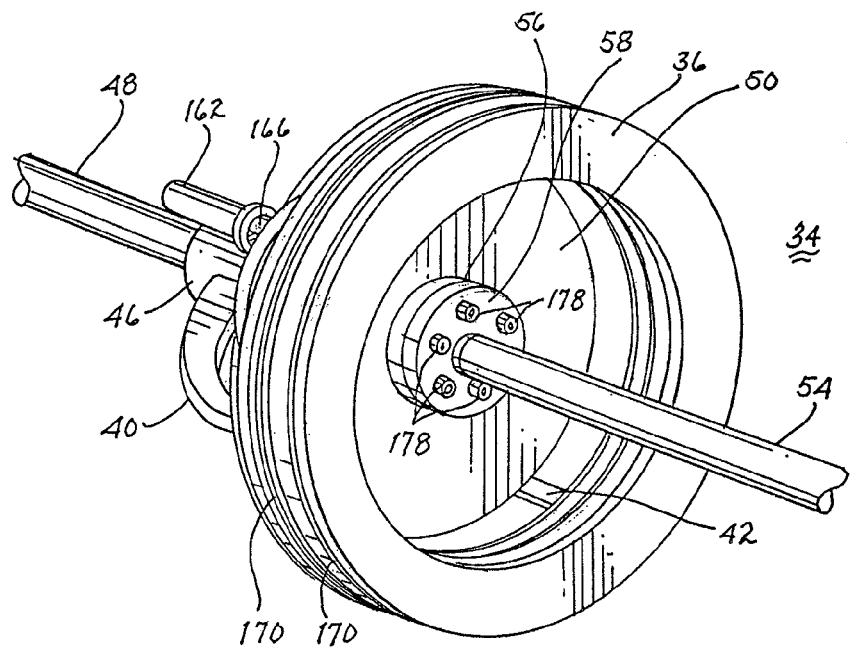
FIG. 15 illustrates the piston and the interconnection between the disk of the poppet valve and the rod sections.

Referring jointly to FIGS. 14 and 15, details attendant displacement of disk 50 from ring 36 to perform maintenance/repair on the disk or the ring will be described. Rods 160, 162 and 164 slidably engage apertures 142, 144, and 146, respectively, and into threaded engagement with threaded apertures 152, 154 and 156, respectively. The rods include nut-like elements 166 formed as part of or affixed to the rods to ensure that any rotation of these nut-like elements results in commensurate rotation of the respective rods. By rotating the nut-like elements clockwise (for instance), the threaded engagement with disk 50 will draw the disk toward annular flange 140 and compress coil spring 148 therebetween. Such movement will result in axial displacement of disk 50, as shown in FIGS. 14. The resulting space between the disk and ring 36 may provide the necessary space to perform any maintenance or repair on the disk or the disk engaging parts of ring 36.

As particularly shown in FIG. 15, rod section 54 includes an annular flange 58 attached thereto. A similar annular flange 56 is attached to the end of rod section 48. A plurality of bolts 178 interconnect the annual flanges whereby rods sections 48, 54 form rod 14 discussed above. It may be noted that upon disengagement of annular flanges 56, 58, rod sections 48 and 54 become separable and, with appropriate disassembly of other components, permit replacement of piston 34 or its components, such as ring 36 and disk 50. To maintain a seal between piston 34 and interior surface 38 of cylinder 12 (see FIG. 4), annular seals 170 may be disposed about ring 36. During disassembly, these seals are also readily replaced.

Figure 16:
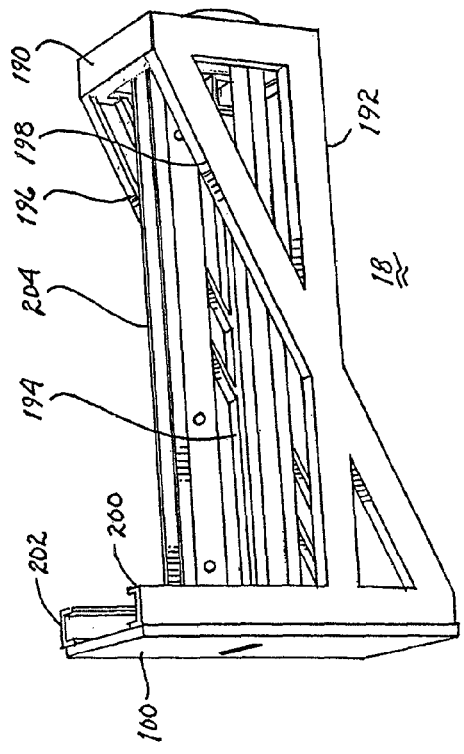
FIG. 16 illustrates the frame interconnecting the cylinder and the motive means for translating the piston.

FIG. 16 illustrates frame 18 for interconnecting the cylinder (reference numeral 12) with motive means (reference numeral 16), as shown in FIG. 3. In particular, it includes a box frame 190 for attachment to the upstream end of the cylinder. Plate 100 is located is located at the opposite end of frame 12 for supporting the motive means. A pair of longerons 192 and 194 interconnect box frame 190 and plate 100. To minimize flexing of frame 18 and to ensure positional stability between box frame 190 and plate 100, a pair of diagonal braces interconnect the upper end of box frame 190 with the lower end of plate 100. Moreover, C-channels 200, 202 are secured to plate 100 and to each of longerons 192, 194 and diagonal braces 196, 198. Thereby, flexing of plate 100 is essentially precluded. Furthermore, a horizontal brace 204 extends intermediate the midpoint of box frame 190 and plate 100 to further stabilize the box frame with the plate. It may be noted that the exact configuration of frame 18 may be varied from that described above, depending upon various factors. For example, frame 18 may be configured similarly to the functionally equivalent frame 206 shown in FIGS. 17 and 18. It may include vibration damping elements 207 of rubber or plastic composition disposed between frame 206 and lower framework 20. Suitable attachment devices well known to those skilled in the relevant vibration damping art provide the requisite physical interconnection.

At most locations, the footprint of a prover is of minor concern and the prover is usually mounted horizontally by means of framework 20 described above. For certain locations, such as the platform of an offshore oil rig, the surface area for equipment is at a premium. As the prover described above is of relatively significant size to perform its intended function, the footprint required for horizontal mounting is of some concern. To reduce the footprint required, a support structure may be added to framework 20 to permit vertical mounting of the prover. Because of the configuration of the prover, as described above, routine maintenance and repair can be performed whether the prover is mounted horizontally or vertically.

Figure 17:
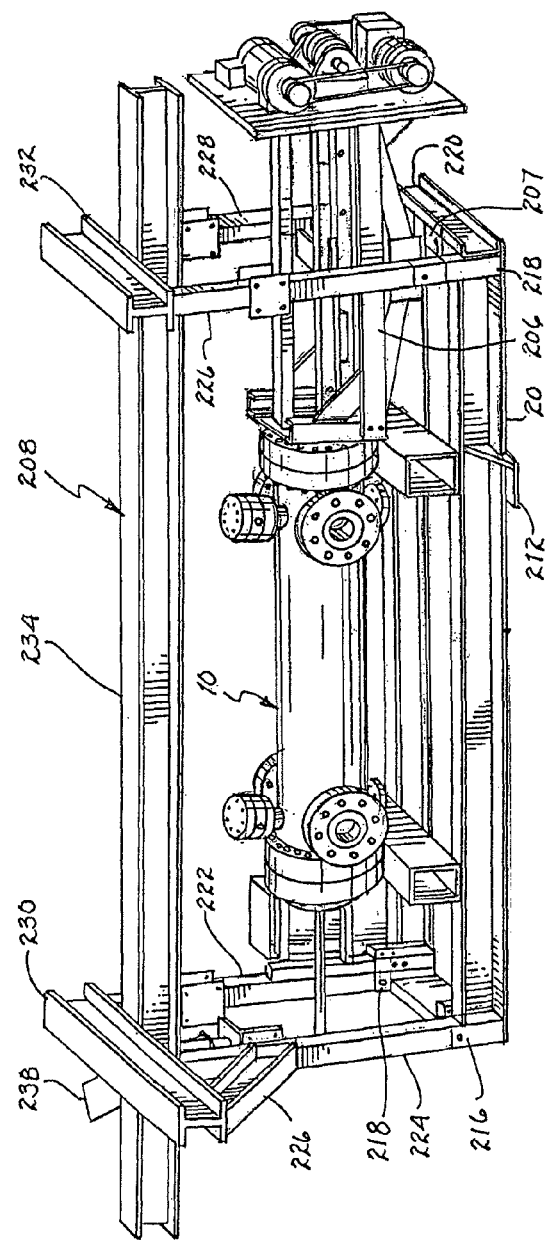
FIG. 17 is an isometric view illustrating the lower framework for supporting the prover horizontally and the upper framework for mounting the prover vertically.
Figure 18:
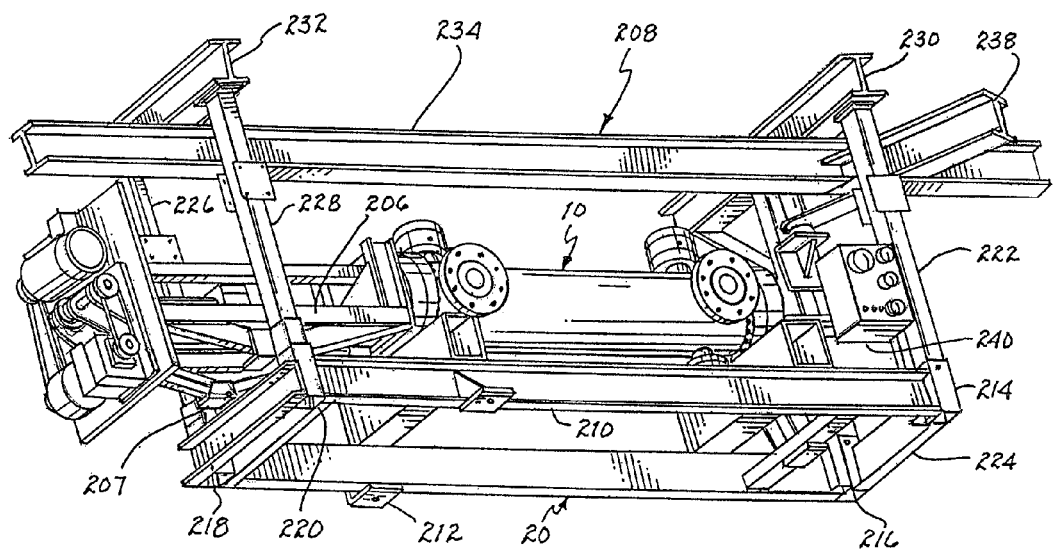
FIG. 18 is an isometric view illustrating the other side of the prover shown in FIG. 12.
Figure 19:
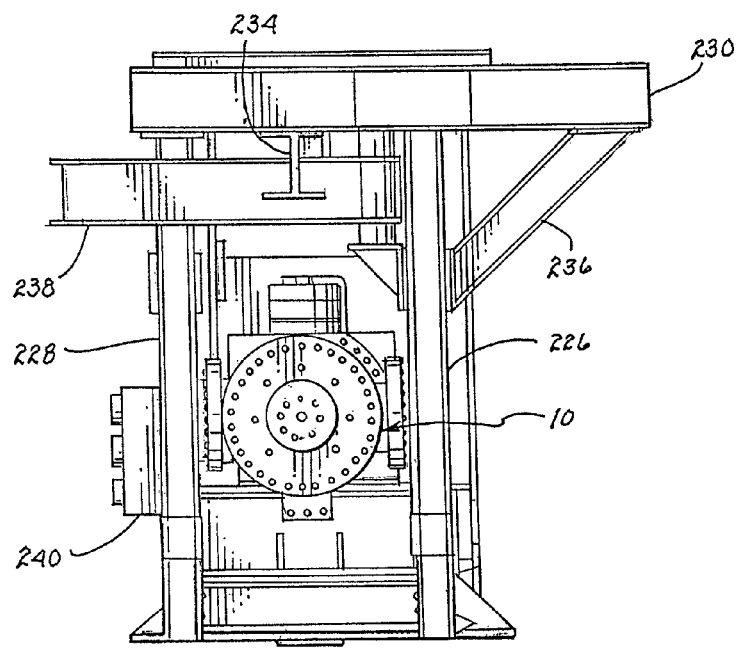
FIG. 19 is an end view of the prover illustrating the lower and upper frameworks for supporting the prover.

Referring jointly to FIGS. 17, 18 and 19, there is shown a prover 10 mounted upon framework 20. This framework may include a plurality of flanges (such as flanges 210, 212) for penetrably receiving bolts in threaded engagement with an underlying supporting surface. It may be defined as a lower framework. To provide an upper framework 208, each corner of framework 20 includes a length of square tubing 214, 216, 218 and 220 for receiving vertical stanchions 222, 224, 226 and 228, respectively. These stanchions are attached to the respective square tubings by bolts, welding or other robust attachment means. Stanchions 222, 224 support a horizontal I-beam 230. Stanchions 226, 228 support a similar I-beam 232. The attachment of these I-beams is the conventional manner well known to ironworkers. To provide further robustness to the upper framework, a further I-beam 234 is attached to the underside of I-beams 230, 232. Thereby, any sway or movement of the stanchions extending upwardly from framework 20 is unlikely to occur upon imposition of normal and expected loads. Additionally, I-beam 234 may be used as a support for hoisting components of prover 10 during maintenance and/or repair thereof. Additional stability is provided by an angled I-beam 236 extending from one end of I-beam 230 to a location along stanchion 226. A yet further I-beam 238 extends from opposed sides of I-beam 234 for various purposes. As particularly shown in FIGS. 18 and 19, a cabinet 240 may be attached to stanchion 222 to support various gauges and control elements relating to operation of prover 10.

For normal operation of prover 10 at most land-based locations, a footprint of a horizontally oriented prover is acceptable. At such locations, the lower framework is attached to supporting structure to prevent movement of the prover relative to pipes and conduits connected thereto. For offshore oil rigs and other locations wherein the size of the footprint of the prover is of concern, upper framework 208 may be used. It is attached to appropriate and corresponding structures associated with the main platform of an offshore oil rig. Thereby, the prover is oriented vertically and the resulting footprint is significantly smaller than if the prover were mounted horizontally. Appropriate pipes and conduits would be employed to interconnect the prover with the flow meter being measured. Whether the prover is mounted horizontally or vertically, access to the prover for repair and maintenance purposes is essentially unimpeded by either the lower or upper framework. Thereby, there is little need to dismantle or otherwise disturb either the lower or the upper framework for these purposes and irrespective of the orientation of the prover at the location of use.

I claim:

1. Validation and self test apparatus for a prover comprising in combination:
   a) a cylinder having an inlet and an outlet for fluid flow through said cylinder;
   b) a piston translatable within said cylinder between said inlet and said outlet;
   c) a rod extending longitudinally through said cylinder and attached to said piston;

d) motive means for providing power to translate said rod and said piston toward said inlet;

e) a shuttle interconnecting said rod with an element extending from said motive means;

f) position locating means for determining the location of said shuttle as said piston moves toward said outlet upon actuation of clutch means for selectively disconnecting said element from said motive means to accommodate travel of said rod and said piston toward said outlet; and g) computation means for determining the quantity of fluid flow within said cylinder as a function of the locations of said shuttle determined by said position locating means.

2. Apparatus as set forth in claim 1 wherein said position locating means comprises a linear encoder for providing at least one output signal.

3. Apparatus as set forth in claim 1 wherein said position locating means comprises a laser detector for providing at least one output signal.

4. Apparatus as set forth in claim 1 wherein said position locating means comprises encoder for said element for providing at least one output signal.

5. Apparatus as set forth in claim 1 wherein said position locating means comprises a plurality of switches located on a switch bar for providing at least one output signal.

6. Apparatus as set forth in claim 5 wherein said position locating means comprises a power interface module for sensing signals generated by said plurality of switches.

7. Apparatus as set forth in claim 6 wherein said position locating means includes a flow computer interconnected with said power interface module for receiving signals therefrom.

8. Apparatus as set forth in claim 7 including sensors for sensing the temperature of said cylinder and the pressure within said cylinder and generating responsive signals for transmission to said flow computer.

9. Apparatus as set forth in claim 8 wherein said flow computer includes preset parameters related to said prover and a program for calculating conformance of the data received from said power interface module with the preset parameters to determine such conformance and generate a signal indicative of either an error or validation of the data received.

10. Apparatus as set forth in claim 9 including a display for displaying either the error or the validation of the data.

11. Apparatus as set forth in claim 1 wherein said position locating means comprises a power interface module for sensing signals generated by movement of said shuttle.

12. A method for self testing and validating the performance of a prover, said method comprising the steps of:
a) translating a piston within a cylinder of a prover from an inlet to an outlet as a function of the inflow of a fluid into the cylinder;
b) determining the relative position of the piston within the cylinder with a rod extending rectilinearly from the piston externally from the cylinder;
c) drawing the rod to relocate the piston toward the inlet with motive means through an element interconnected with the rod through a shuttle;
d) sensing the position of the shuttle during said step of translating;

e) calculating the volume within the cylinder during said step of translating as a function of said step of sensing;
f) comparing the volume determined during exercise of said step of calculating with preset parameters; and
g) generating a signal based upon the comparison made during exercise of said step of comparing.

13. Method as set forth in claim 12 wherein exercise of said step of sensing produces indications of a first and a second position of said shuttle that correlate with a first and a second positions of said piston.

14. Method as set forth in claim 12 wherein said step of sensing is carried out by a plurality of switches.

15. Method as set forth in claim 12 wherein said step of sensing is carried out by a linear encoder.

16. Method as set forth in claim 12 wherein said step of sensing is carried out by a laser detector.

17. Method as set forth in claim 12 wherein said step of sensing is carried out by an encoder responsive to translation of the element.

18. Method as set forth in claim 12 wherein said steps of calculating, comparing and generating are carried out by a computer.

19. Method as set forth in claim 12 including a step of displaying the signal produced during said step of generating.

20. A method for self testing and validating the performance of a prover, said method comprising the steps of:
a) translating a piston within a cylinder of a prover from an inlet to an outlet as a function of the inflow of a fluid into the cylinder;
b) determining the relative position of the piston within the cylinder with a rod extending rectilinearly from this piston externally from the cylinder;
c) drawing the rod to relocate the piston toward the inlet with motive means through an element interconnected with the rod through a shuttle;
d) sensing the position of the shuttle as the piston translates toward the outlet;
e) generating signals in response to translation of the shuttle;
f) calculating the displacement volume within the cylinder in response to the generated signals; and
g) comparing the calculated displacement volume with preset parameters to generate an output signal reflective of the difference between the calculated displacement volume and the preset parameters.

21. Method as set forth in claim 20 including a step of using a plurality of switches to generate the signals.

22. Method as set forth in claim 20 including a step of using a laser detector to detect the position of the shuttle and generate the signals.

23. Method as set forth in claim 20 including a step of using a linear encoder to detect the position of the shuttle and generate the signals.

24. Method as set forth in claim 20 including a step of using an encoder to detect translation of the element to detect the position of the piston and generate the signals.

* * * * *